(12) United States Patent
Cui et al.

(10) Patent No.: US 9,208,049 B2
(45) Date of Patent: Dec. 8, 2015

(54) METHOD AND DEVICE FOR MANAGING DESKTOP WITH AN ADDITIONAL MIRROR DESKTOP IN THE SAME OPERATION INTERFACE

(71) Applicant: Tencent Technology (Shenzhen) Company Limited, Shenzhen (CN)

(72) Inventors: Xiaolin Cui, Shenzhen (CN); Xiangru Li, Shenzhen (CN); Wenze Yang, Shenzhen (CN); Xuan Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/118,838

(22) PCT Filed: Nov. 21, 2012

(86) PCT No.: PCT/CN2012/084994
§ 371 (c)(1),
(2) Date: Nov. 19, 2013

(87) PCT Pub. No.: WO2013/091456
PCT Pub. Date: Jun. 27, 2013

(65) Prior Publication Data
US 2014/0298108 A1    Oct. 2, 2014

(30) Foreign Application Priority Data

Dec. 23, 2011    (CN) .......................... 2011 1 0438880

(51) Int. Cl.
*G06F 11/30*    (2006.01)
*G06F 11/14*    (2006.01)
(Continued)

(52) U.S. Cl.
CPC .......... *G06F 11/3079* (2013.01); *G06F 3/1454* (2013.01); *G06F 9/4445* (2013.01);
(Continued)

(58) Field of Classification Search
None
See application file for complete search history.

(56) References Cited

U.S. PATENT DOCUMENTS 6,691,154 B1 * 2/2004 Zhu et al. ....................... 709/204
7,620,667 B2 * 11/2009 Rollin et al. ........................... 1/1
(Continued)

FOREIGN PATENT DOCUMENTS

CN    1630246    6/2005
CN    101132571    2/2008
(Continued)

OTHER PUBLICATIONS

Wright, Jake. How to use Remote Desktop Connection. Jan. 6, 2010 [retrieved on Dec. 31, 2014]. Retrieved from the Internet: <URL: https://www.youtube.com/watch?v=Oi6cUxrALCc>.*
(Continued)

*Primary Examiner* — Gabriel Chu
*Assistant Examiner* — Paul Contino
(74) *Attorney, Agent, or Firm* — Ladas & Parry LLP (57) ABSTRACT

A mirror desktop is started to acquire desktop icons of an operation object desktop such that desktop icon content of the mirror desktop is substantially the same as that of the operation object desktop. The desktop icons of the mirror desktop are displayed in accordance with a saved arrangement manner of the mirror desktop without affecting the original arrangement mode of the operation object desktop so as to provide a personalized mirror desktop for the user. The operation object desktop is not directly operated, and therefore the loss and disorder of the content of the operation object desktop can be avoided.

18 Claims, 3 Drawing Sheets

(51) Int. Cl.
  *G06F 11/16* (2006.01)
  *G06F 11/20* (2006.01)
  *G06F 11/36* (2006.01)
  *G06F 3/14* (2006.01)
  *G06F 9/44* (2006.01)
  *G06F 3/0481* (2013.01)
  *H04L 29/08* (2006.01)

(52) U.S. Cl.
  CPC ........ G06F11/1675 (2013.01); G06F 11/2056 (2013.01); G06F 11/302 (2013.01); H04L 67/025 (2013.01); *G06F 3/0481* (2013.01); *G06F 3/04817* (2013.01); *G06F 11/1466* (2013.01); *G06F 11/2082* (2013.01); *G06F 11/3668* (2013.01)

(56) References Cited

U.S. PATENT DOCUMENTS

| | | | | |
|---|---|---|---|---|
| 8,719,522 | B1* | 5/2014 | Chait | G06F 9/455 709/203 |
| 2006/0230105 | A1* | 10/2006 | Shappir | H04L 67/08 709/203 |
| 2006/0244734 | A1 | 11/2006 | Hill et al. | |
| 2008/0052776 | A1* | 2/2008 | Prabhat et al. | 726/15 |
| 2008/0244028 | A1* | 10/2008 | Le | G06F 3/0607 709/208 |
| 2009/0144515 | A1* | 6/2009 | Benari | G06F 11/1471 711/162 |
| 2009/0216975 | A1* | 8/2009 | Halperin | G06F 9/45537 711/162 |
| 2009/0222739 | A1* | 9/2009 | Schmieder et al. | 715/740 |
| 2009/0228801 | A1* | 9/2009 | Lee et al. | 715/730 |
| 2010/0050111 | A1* | 2/2010 | Duffy | G06F 3/0484 715/781 |
| 2010/0070978 | A1* | 3/2010 | Chawla | G06F 9/5077 718/105 |
| 2010/0293504 | A1* | 11/2010 | Hachiya | G06F 9/4443 715/806 |
| 2011/0219225 | A1* | 9/2011 | Yamazaki et al. | 713/100 |
| 2011/0219331 | A1* | 9/2011 | DeLuca | G06F 3/048 715/799 |
| 2013/0005488 | A1* | 1/2013 | Evans | A63F 13/10 463/43 |
| 2013/0125009 | A1* | 5/2013 | DeLuca et al. | 715/740 |

FOREIGN PATENT DOCUMENTS

| | | |
|---|---|---|
| CN | 101447998 A | 6/2009 |
| CN | 101930363 | 12/2010 |

OTHER PUBLICATIONS

Cisco WebEx: Use Cisco WebEx Meeting Center features to bring your meetings to life. 2010. Cisco Systems, Inc.*

WebEx Training Center: Attendee's Guide. WebEx Communications, Inc. Sep. 18, 2006. p. 73.*

* cited by examiner

METHOD AND DEVICE FOR MANAGING DESKTOP WITH AN ADDITIONAL MIRROR DESKTOP IN THE SAME OPERATION INTERFACE

CROSS-REFERENCE TO RELATED APPLICATIONS

This application represents a National Stage application of PCT/CN2012/084994 entitled "Desktop Management Method and Device" filed Nov. 21, 2012, pending.

FIELD OF THE INVENTION

The present disclosure relates to the field of a calculator, and more particularly it relates to a desktop management method and device.

BACKGROUND OF THE INVENTION

In a conventional user machine, a desktop is usually included therein. The desktop is the fundamental connection of an interface communication among the operation system (OS), webpage applications or any other application software. When different kinds of application programs or operating systems are installed on the user machine, the desktop of the user machine will be filled with many different kinds of icons, such as shortcuts, documents, folders and so on. Therefore, the desktop of the equipment will be confused and disordered. The normal user machine will directly classify and manage the desktop icons on the desktop of the user machine. When there is an operation error, the desktop of the user machine will be damaged and the content of the desktop icons on the user machine will be lost or disordered.

THE PUBLICATION OF THE DISCLOSURE

Technological Problem

A desktop management method and apparatus is disclosed in the present disclosure which prevents the contents of the operation object desktop from being lost or disordered when the user implements and operates the operation object desktop.

SUMMARY OF THE INVENTION

The Solution Technique

A desktop management method, comprising:
acquiring desktop icons of an operation object desktop when starting up a mirror desktop;
adjusting the desktop icons of the mirror desktop according to the desktop icons of the operation object desktop to make the desktop icons of the mirror desktop the same as that of the operation object desktop; and
displaying the desktop icons of the adjusted mirror desktop according to the arranging manner for the saved mirror desktop;
wherein the desktop icons of the operation object desktop are acquired by an application program interface (API) of the operation object desktop.

A desktop management method, comprising:
acquiring desktop icons of an operation object desktop when starting up a mirror desktop;
adjusting the desktop icons of the mirror desktop according to the desktop icons of the operation object desktop to make the desktop icons of the mirror desktop the same as that of the operation object desktop; and
displaying the desktop icons of the adjusted mirror desktop according to the arranging manner for the saved mirror desktop.

A desktop management device, comprising:
an acquiring module configured for acquiring desktop icons of an operation object desktop when starting up a mirror desktop;
an adjusting module configured for adjusting the desktop icons of the mirror desktop according to the desktop icons of the operation object desktop to make the desktop icons of the mirror desktop the same as that of the operation object desktop; and
a display module configured for displaying the desktop icons of the adjusted mirror desktop according to the arranging manner for the saved mirror desktop.

Advantage

The mirror desktop is started to acquire the desktop icons of the operation object desktop and the mirror desktop is adjusted in accordance with the desktop icons of the operation object desktop to make the desktop icons of the adjusted mirror desktop the same as the desktop icons of the operation object desktop. The desktop icons of the adjusted mirror desktop are displayed in accordance with a saved arrangement mode of the mirror desktop without affecting the original arrangement mode of the operation object desktop so as to provide a personalized mirror desktop for the user. Since the operation object desktop is not directly operated, the loss and disorder of the content of the operation object desktop can be avoided.

DETAILED DESCRIPTION OF THE PREFERRED EMBODIMENTS

The above-mentioned description of the present disclosure can be best understood by referring to the following detailed description of the preferred embodiments and the accompanying drawings.

Figure 1:
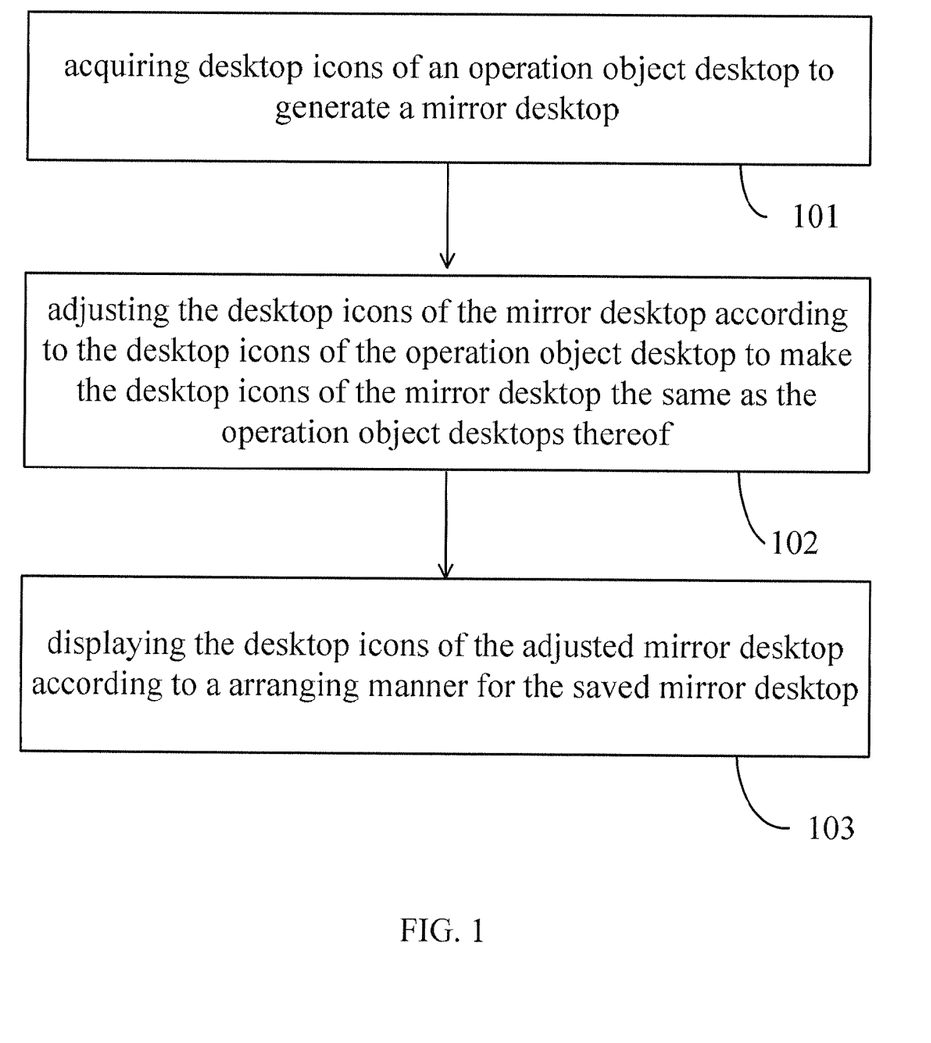
FIG. 1 is a flow chart illustrating a desktop management method, providing one embodiment of the present disclosure.

FIG. 1 is a flow chart illustrating a desktop management method in one embodiment of the present disclosure. As shown in FIG. 1, an executive main object in the desktop management method can be a server or a terminal, and the terminal includes a calculator terminal and a consumer electronic terminal, such as a Personal Digital Assistant (PDA), a cellular phone, a tablet (iPad) and so on. An operation object in the desktop management method in this embodiment of the present disclosure is an operation object desktop and the operation object desktop can be an operating system desktop, a webpage system desktop, an application software desktop or a webpage application desktop (ex: a desktop on QQ webpage and so on). Please refer to FIG. 1. The desktop management method implements the mirror desktop on the operating system, the webpage system, the application software or the webpage application to achieve the management of the operation object desktop. The mirror desktop can be a part of the application program, the webpage application or the application software executed on the operation object desktop, and the method comprises the following steps:

In step 101, the desktop icons of an operation object desktop are acquired to generate a mirror desktop;

The desktop icons on the operation object desktop include, but are not limited to, some default desktop icons, such as "My Computer", "Recycle", and "Network Neighbor" on the Windows operating system. The default desktop icons can be displayed or not displayed on the operation object desktop in accordance with the configuration of the user. The desktop icons of the operation object desktop can further be shortcut icons of application programs, folder icons, document icons, and so on.

For different operating systems, webpage systems, webpage applications or application software, a person with ordinary skill in the art knows the desktop icons on the operation object desktop will be different in accordance with the usage conditions from different users. According to the user's implementation, the content of the desktop icons on the operation object desktop will be continuously varied.

Furthermore, before step 101, when the mirror desktop is initiated and started for the first time, the method further includes the steps of: duplicating all of the desktop icons on the operation object desktop to generate a page with all of the desktop icons and arranging all of the desktop icons on the page according to a predetermined arranging manner of the mirror desktop. The arranged page is the mirror desktop.

The mirror desktop is the desktop with the same desktop icons as the desktop icons of the operation object desktop. The desktop icons are generated by duplicating the desktop icons of the operation object desktop. The duplication is to guarantee the consistency of the data. The desktop icons can be classified and arranged on the mirror desktop. The user seems to operate the desktop icons in the mirror and the original status thereof can be recovered at any time.

In step 102, the desktop icons of the mirror desktop are adjusted according to the desktop icons of the operation object desktop so as to make the desktop icons of the mirror desktop the same as the operation object desktops thereof.

Practically, when the desktop icons of the operation object desktop are different from the desktop icons of the mirror desktop, the desktop icons of the mirror desktop are added, deleted or modified in accordance with the desktop icons of the operation objection desktop to make the desktop icons of the mirror desktop the same as the desktop icons of the operation object desktop.

In step 103, the desktop icons of the adjusted mirror desktop are displayed according to the arranging manner for the saved mirror desktop.

The arrangement in the present embodiment is a procedure for classifying and sorting the desktop icons. The classification is to separate the desktop icons into different categories in accordance with a predetermined classifying manner. For example, as the mirror desktop is a Q+ desktop, the predetermined classifying manner is to separate the desktop icons in accordance with the system default icon, the shortcuts of the application programs and the documents. The sorting is to sort the desktop icons in accordance with a predetermined sorting manner. For example, as the mirror desktop is a Q+ desktop, the predetermined sorting manner can sort the desktop icons in an ascending fashion in accordance with a modifying time.

The method provided in the present embodiment is to acquire the desktop icons of the operation object desktop to generate the mirror desktop and the mirror desktop is adjusted in accordance with the desktop icons of the operation object desktop. Therefore, the mirror desktop is the same as the operation object desktop and the adjusted desktop icons of the mirror desktop are displayed in accordance with the arranging manner for the saved mirror desktop. An autobiography mirror desktop is provided for the user without affecting the original display on the operation object desktop. Because the operation object desktop is not directly operated, the loss or disorder of the content in the operation object desktop can be avoided.

Figure 2:
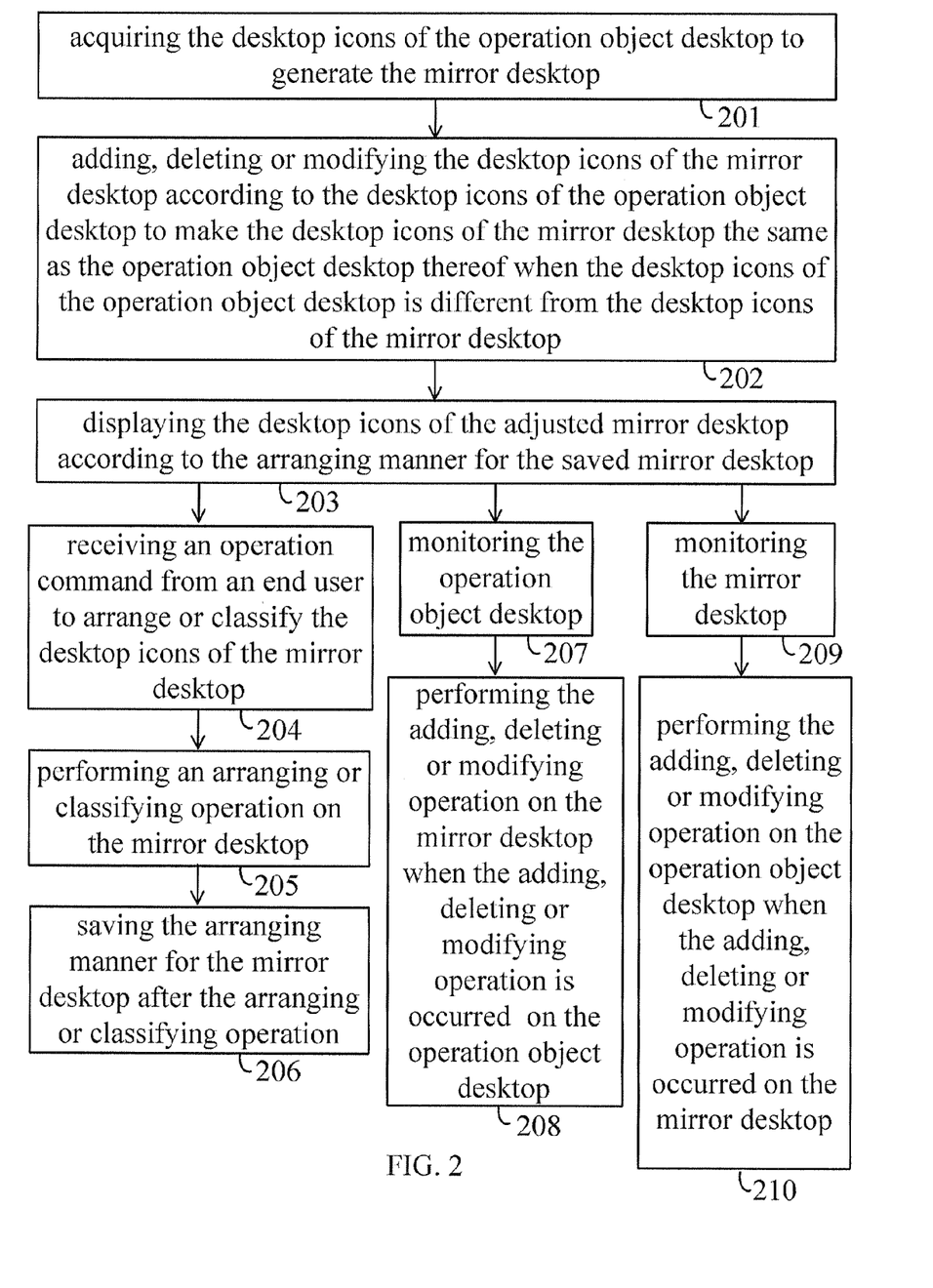
FIG. 2 is a flow chart illustrating a desktop management method, providing another embodiment of the present disclosure.

FIG. 2 is a flow chart illustrating another desktop management method in the embodiment of the present disclosure. As shown in FIG. 2, the embodiment comprises:

In step 201, the desktop icons of the operation object desktop are acquired to generate the mirror desktop.

The mirror desktop is started by the user or started by default when the system is turned on.

The desktop icons of the operation object desktop are acquired by calling an Application Programming Interface (API) of the operation object desktop. There are many APIs with different functions in the operation object (such as operating systems, application software, webpage applications and so on). In the present embodiment, the desktop icon includes an icon path and a display name. In step 201, the icon path and the display name can be acquired by calling the API.

The desktop icons on the operation object desktop include, but are not limited to, "My Computer", "Recycle", "Network" and so on in the Windows OS. The desktop icons of the operation object desktop further include the shortcut icons of the application programs, the folder icons, document icons and so on.

Preferably, when acquiring the desktop icon information of the system default icons, such as "My computer", "Recycle", "Control Panel" and so on, not only is the icon path and the icon display name acquired, but the display status thereof is read from the registry. Therefore, the display status of the system default icons on the mirror desktop is adjusted in accordance with the display status of the system default icons of the operation object desktop.

It should be noted that, before step 201, the method further includes the following steps when the mirror desktop is started for the first time. First, all of the desktop icons of the operation object desktop are acquired and duplicated to generate a page with all of the desktop icons. Then, all of the desktop icons on the page are arranged in accordance with the predetermined arranging manner of the mirror desktop, and the arranged page is used as the mirror desktop. When all of the desktop icons of the operation object desktop are acquired and duplicated, all of the desktop icons on the desktop can be acquired by an enumeration and all of the desktop icons can be duplicated. Practically, for the system default icons, such as "My computer", "Recycle", "Control Panel" and so on, it is necessary not only to duplicate the icon, but also to read the display status from the registry. When the display status of the system default icons in the registry is to not display the system default icons, the system default icons are not displayed on the mirror desktop. When the display status of the system default icon in the registry is to display the system default icons, the system default icons are displayed on the mirror desktop. Therefore, the display of the mirror desktop is the same as the operation object thereof. It is during the procedure for generating the mirror desktop before step 201 when the mirror desktop is used at the first time. In this procedure, the desktop icons on the mirror desktop are arranged in accordance with the predetermined arranging manner. The predetermined arranging manner is set by trained personnel, or it is set by the user during the usage procedure.

In step 202, the desktop icons of the mirror desktop are added, deleted, or modified according to the desktop icons of the operation object desktop to make the desktop icons of the mirror desktop the same as the operation object desktop thereof when the desktop icons of the operation object desktop are different from the desktop icons of the mirror desktop.

In the present embodiment, the terminal includes the desktop icons of the mirror desktop. When the mirror desktop is started, the desktop icons of the operation object desktop are acquired by the terminal and the desktop icons of the operation object desktop are compared with the desktop icons of the mirror desktop. When the desktop icons of the operation object include all of the desktop icons of the mirror desktop, but the desktop icons of the mirror desktop don't include all of the desktop icons of the operation object desktop, the desktop icons of the operation object desktop are duplicated to the mirror desktop and the desktop icons of the mirror desktop are arranged by the predetermined arranging manner of the mirror desktop. Preferably, the desktop icons of the operation object desktop are disposed behind the original desktop icons on the mirror desktop so as to let the user know that they have been modified.

When the desktop icons of the mirror desktop include the desktop icons of the operation object desktop, but the desktop icons of the operation object desktop don't include all of the desktop icons of the mirror desktop, the desktop icons of the mirror desktop which are not displayed on the operation object desktop are deleted.

For the mirror desktop, when any one of the icon paths or the icon display names of the desktop icons of the operation object desktop is different from the corresponding desktop icons of the mirror desktop, the corresponding desktop icons of the mirror desktop are modified in accordance with the icon paths or the icon display names of the desktop icons of the operation object desktop. Therefore, the modified desktop icons of the mirror desktop are the same as the desktop icons of the operation object desktop.

In the present embodiment, the desktop icon comprises the icon path and the icon display name, so the adding, deleting or modifying step is executed to add, delete or modify the icon path or the icon display name.

It should be noted that the acquiring procedure in step 201 and the adjusting procedure in step 202 are executed when the mirror desktop is started to keep the consistency between the mirror desktop and the operation object desktop.

Furthermore, in order for the user feel familiar with the mirror desktop during operation, the operation convenience of the operation object desktop is reserved, interface beautification is added, and a magnificently brilliant display affect is implemented to colorize the user desktop.

In step 203, the desktop icons of the adjusted mirror desktop are displayed according to the arranging manner for the saved mirror desktop.

When the terminal includes the arranging manner for the saved mirror desktop, the desktop icons of the mirror desktop are arranged in accordance with the arranging manner for the saved mirror desktop and the arrangement can guarantee that the desktop icons of the mirror desktop at this starting time are the same for the next starting time. The desktop icons on the mirror desktop are arranged according to the arranging manner for the saved mirror desktop in the last starting time. The specific arrangement of the desktop icons on the mirror desktop is reserved.

When the arranging manner for the mirror desktop is not saved in the terminal, the desktop icons of the mirror desktop are arranged in accordance with the predetermined arranging manner.

It should be noted that the sequence of step 202 and 203 can be such that step 202 is executed first and then step 203, or step 203 is executed first and then step 202.

In step 204, an operation command from an end user is received to arrange or classify the desktop icons of the mirror desktop.

In order to guarantee the display manner of the desktop icons on the operation object desktop are not affected when the arranging or classifying operation command for the desktop icons of the mirror desktop is received, the arranging or classifying operation command is executed only on the mirror desktop. The arranging manner of the mirror desktop is saved after the arranging and classifying operation, but the arranging or classifying operation command is not in the operation object desktop. For example, when the operation command is a command to perform arrangement, this would only arrange the desktop icons on the mirror desktop and save the arranging manner for the arranged mirror desktop. It should be noted that the arranging or classifying operation command is only to instruct one desktop icon, or two or more desktop icons. For example, the arranging or classifying operation command is practically used to instruct the chosen desktop icon to move to a specific location on the mirror desktop, thus changing the arranging position.

In the present embodiment, the arranging or classifying operation command to arrange the desktop icon A on the mirror desktop is only given as an example.

In step 205, an arranging or classifying operation is performed on the mirror desktop.

During the arranging or classifying operation, the command instructs the mirror desktop to do the arranging or classifying operation command. If the operation command is to instruct the arranging command, the arranging operation is executed, and if the operation command is to instruct the classifying command, the classifying operation is executed. It should be noted that the arranging or classifying operation command used to instruct the arranging or classifying operation is to operate the display manner of the desktop icons on the mirror desktop, but it is not to perform a practical modification, such as deleting, modifying or adding, on the desktop icons of the mirror desktop.

In step 206, the arranging manner for the mirror desktop after the arranging or classifying operation is saved.

Preferably, the arrangement of the desktop icons after the arranging or classifying operation command is displayed. Because the arranging manner of the mirror desktop which has performed the arranging or classifying operation is different from the arranging manner of the mirror desktop which didn't perform the arranging or classifying operation, it is necessary to save arranging manner of the mirror desktop which performed the arranging or classifying operation. When the mirror desktop is started the next time, it is displayed according to the saved mirror desktop and the arranging manner for each of the desktop icons on the mirror desktop. For example, the operation command instructs desktop icon A on the mirror desktop to classify. After the classifying operation is done, the arranging manner on the mirror desktop is changed and the changed arranging manner on the mirror desktop is saved.

The mirror desktop includes all of the desktop icons on the operation object desktop, but the arranging or classifying operation command won't modify the desktop icons of the operation object desktop when the user is performing the arranging or classifying operation on the mirror desktop. The original status of the system and the original arranging manner of the user desktop are reversed to avoid some operation mistakes or procedural drawbacks in the mirror desktop which could confuse the user desktop.

Furthermore, in order to make the desktop icons on the operation object desktop the same as those on the mirror desktop, after step 203, the embodiment includes the following steps:

In step 207, the operation object desktop is monitored.

Monitoring the operation object desktop can be done by monitoring the registry information of the system. When the adding, deleting or modifying operation occurs on the operation object desktop, the registry information monitors the change of the desktop icons on the operation object desktop to recognize the adding, deleting or modifying operation and the adding, deleting or modifying operation is synchronized to the mirror desktop.

In step 208, the adding, deleting or modifying operation is performed on the mirror desktop when the adding, deleting or modifying operation is occurred on the operation object desktop.

When the mirror desktop receives the information that the desktop icons on the operation object desktop have been changed, the adding, deleting or modifying operation is executed on the mirror desktop.

In step 209, the mirror desktop is monitored.

The monitor is for operations on the mirror desktop. Preferably, operations on the mirror desktop are monitored and filtered. When the adding, deleting or modifying operation is occurred on the mirror desktop, step 210 is executed.

In step 210, the adding, deleting or modifying operation on the operation object desktop is executed when the adding, deleting or modifying operation is occurred on the mirror desktop.

When the adding, deleting or modifying operation has occurred on the mirror desktop and the registry information has monitored the adding, deleting or modifying operation, then the adding, deleting or modifying operation is synchronized on the operation object desktop. Preferably, the adding, deleting or modifying operation on the operation object desktop is executed by call the API in the Windows OS.

The adding operation is the operation to add a desktop icon. The deleting operation is the operation to delete a desktop icon. The modifying operation is the operation to modify a desktop icon. The modifying operation is, but is not limited to, to modify the desktop icon path or the icon display name.

The desktop icons on the mirror desktop and the operation object desktop can be different, but in order to keep the consistency of the desktop icons on the mirror desktop and the operation object desktop, it is necessary to monitor the operation object desktop and the mirror desktop. When a change of the desktop icons in any one of the desktops is occurred, a change of the corresponding icons or information is synchronized to another desktop. The monitoring procedure is to associate the operation object desktop with the mirror desktop and performs the mutual synchronization. Moreover, when a failure of the adding, deleting or modifying operation on the mirror desktop is occurred, the adding, deleting or modifying operation won't perform on the operation object desktop. When a failure of the adding, deleting or modifying operation on the operation object desktop is occurred, the adding, deleting or modifying operation won't be performed on the mirror desktop.

The method provided in the present embodiment is to acquire the desktop icons of the operation object desktop to generate the mirror desktop, and the mirror desktop is adjusted in accordance with the desktop icons of the operation object desktop to make the mirror desktop the same as the operation object desktop. The adjusted desktop icons of the mirror desktop are displayed in accordance with the adjusting manner for the saved mirror desktop. The personalized mirror desktop is provided for the user without affecting the original display manner of the operation object desktop. Because the operation object desktop is not directly operated, the loss or disorder of the content of the operation object desktop can be avoided. Moreover, during the management process, when the arranging or classifying operation has occurred in the mirror desktop, the mirror desktop is saved after executing the arranging or classifying operation to avoid the possibility of damage due to direct management in the operation object desktop. When the display result, such as classifying or arranging, on the desktop icons on the mirror desktop is optimized, it won't affect the display of the operation object on the operation object desktop. Moreover, the variety of conditions on the operation object desktop is acquired promptly and the mirror desktop is synchronized. The adding, deleting or modifying operation on the mirror desktop responds directly to the operation object desktop to keep the mutual consistency on both sides.

Figure 3:
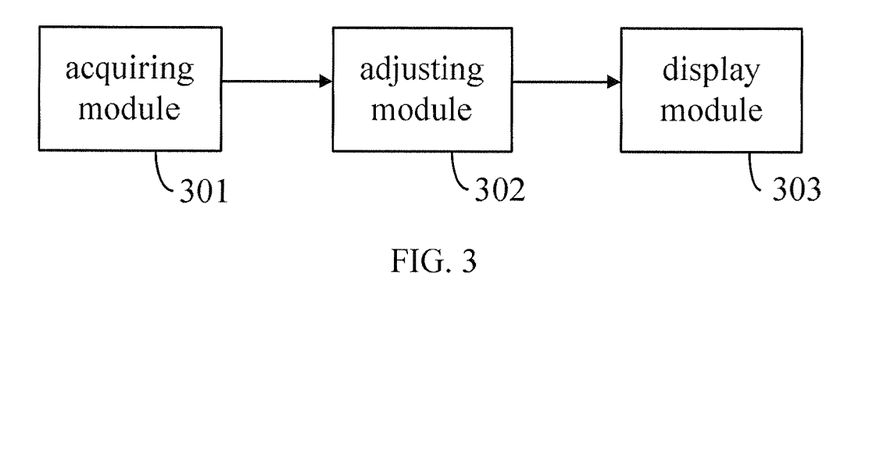
FIG. 3 is a flow chart illustrating a desktop management device, providing one embodiment of the present disclosure.

FIG. 3 is a structural view illustrating a desktop management device provided in this embodiment of the present disclosure. The device is to execute the method described in FIG. 1 and FIG. 2. As shown in FIG. 3, the device comprises:

An acquiring module 301 is configured for acquiring desktop icons of an operation object desktop when a mirror desktop is started up.

Preferably, acquiring module 301 is configured for acquiring desktop icons of an operation object desktop by calling the API of the operation object desktop when a mirror desktop is started up.

An adjusting module 302 is configured for adjusting the desktop icons of the mirror desktop according to the desktop icons of the operation object desktop to make the desktop icons of the mirror desktop the same as that of the operation object desktop.

Preferably, adjusting module 302 is configured for executing the adding, deleting or modifying operation in the desktop icons of the mirror desktop according to the desktop icons of the operation object desktop when the desktop icons of the mirror desktop are different from the desktop icons of the operation object desktop. Therefore, the adjusted desktop icons of the mirror desktop are the same as the desktop icons of the operation object desktop.

A display module 303 is configured for displaying the desktop icons of the adjusted mirror desktop according to the arranging manner for the saved mirror desktop.

The acting object of the desktop management device in the embodiment of the present disclosure is the operation object desktop, and the operation object desktop can be an operating system (OS) desktop, a webpage system desktop, an application software desktop or a webpage application desktop, such as a desktop in QQ webpage, and so on.

Figure 4:
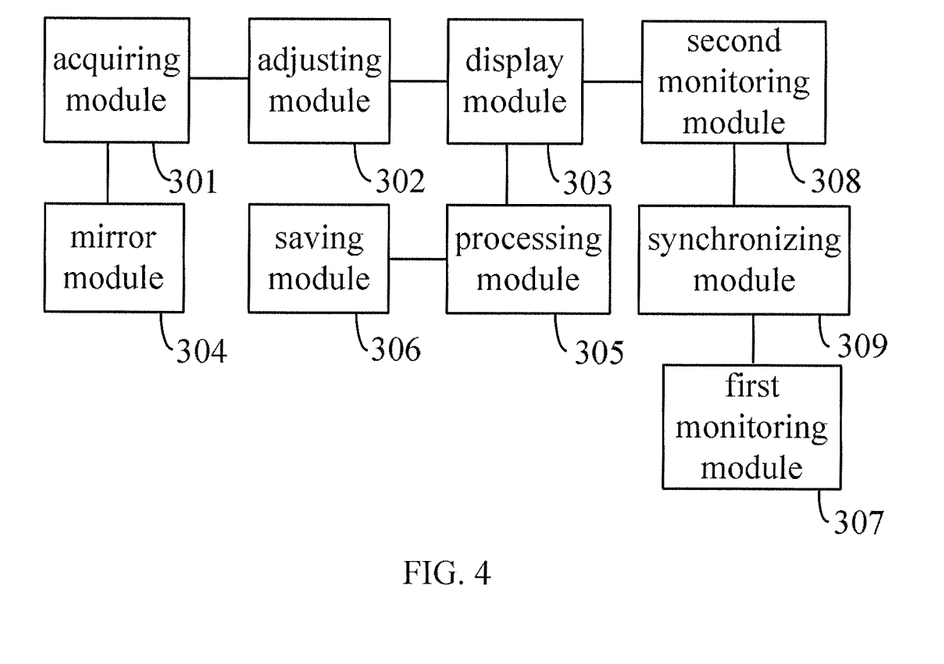
FIG. 4 is a flow chart illustrating a desktop management device, providing another embodiment of the present disclosure.

Furthermore, FIG. 4 is a structural view illustrating the desktop management device in another embodiment of the present disclosure. As shown in FIG. 4, the device comprises: an acquiring module 301, an adjusting module 302 and a displaying module 303.

The device further comprises:

A mirror module 304 is configured for duplicating the desktop icons on the operation object desktop to generate a page with the desktop icons and arranging the desktop icons on the page according to a predetermined arranging manner of the mirror desktop.

A processing module 305 is configured for receiving an operation command from an end user to arrange or classify the desktop icons of the mirror desktop.

A saving module 306 is configured for saving the arranged mirror desktop after an arranging or classifying operation.

The device further comprises:

A first monitoring module 307 is configured for monitoring the operation object desktop. A synchronizing module 308 is configured for adding, deleting or modifying on the mirror desktop when an adding, deleting or modifying operation occurred on the operation object desktop. In addition, the first monitor module 307 is further configured for monitoring a failure of the adding, deleting or modifying operation on the operation object desktop and the synchronizing module 308 won't perform the adding, deleting or modifying operation on the mirror desktop.

A second monitoring module 309 is configured for monitoring the mirror desktop. In addition, the second monitoring module 309 is further configured for monitoring a failure of the adding, deleting or modifying operation on the mirror desktop and the synchronizing module 308 won't perform the adding, deleting or modifying operation on the operation object desktop.

Synchronizing module 308 is further configured for adding, deleting or modifying on the operation object desktop when the adding, deleting or modifying operation is occurred on the operation object desktop.

The monitoring of the operation object desktop is achieved by the registry information and first monitoring module 307 is to recognize the adding, deleting or modifying operation when the adding, deleting or modifying operation is occurred on the operation object desktop and the registry information monitors the change of the desktop icons of the operation object desktop. Therefore, the adding, deleting or modifying operation is synchronized on the mirror desktop.

As described above, the present disclosure has been described with preferred embodiments thereof and it is understood that many changes and modifications to the described embodiments can be carried out without departing from the scope and the spirit of the disclosure that is intended to be limited only by the appended claims.

What is claimed is:

1. A desktop management method, comprising:
acquiring desktop icons of an operation object desktop to generate a mirror desktop;
adjusting the desktop icons of the mirror desktop according to the desktop icons of the operation object desktop to make the desktop icons of the mirror desktop the same as the operation object desktop thereof;
displaying the desktop icons of the adjusted mirror desktop according to an arranging manner for a saved mirror desktop, the desktop icons of the adjusted mirror desktop being displayed in accordance with a saved arrangement manner of the mirror desktop without affecting an original arrangement mode of the operation object desktop;
monitoring the operation object desktop to edit the mirror desktop according to an adding, deleting or modifying operation occurred on the operation object desktop; and
monitoring the mirror desktop to edit the operation object desktop according to an adding, deleting or modifying operation occurred on the mirror desktop,
wherein the desktop icons of the operation object desktop are acquired by an application program interface (API) of the operation object desktop and the desktop icons of the mirror desktop are the same as the desktop icons of the operation object desktop; and
wherein the step of monitoring the operation object desktop to edit the mirror desktop according to an adding, deleting or modifying operation occurred on the operation object desktop comprises monitoring a failure of the adding, deleting or modifying operation on the operation object desktop; and stopping editing the mirror desktop in response to the failure.

2. The method according to claim 1, wherein before the step of acquiring the desktop icons of the operation object desktop to generate the mirror desktop, the method further comprises:
duplicating the desktop icons on the operation object desktop to generate a page with the desktop icons; and
arranging the desktop icons on the page according to a predetermined arranging manner of the mirror desktop.

3. The method according to claim 1, wherein before the step of adjusting the desktop icons of the mirror desktop according to the desktop icons of the operation object desktop to make the desktop icons of the mirror desktop the same as that of the operation object desktop, the method further comprises:
adding, deleting or modifying the desktop icons of the mirror desktop according to the desktop icons of the operation object desktop to make the desktop icons of the mirror desktop the same as the operation object desktop thereof when the desktop icons of the operation object desktop are different from the desktop icons of the mirror desktop.

4. The method according to claim 1, wherein after the step of displaying the desktop icons of the adjusted mirror desktop according to the arranging manner for the saved mirror desktop, the method comprises:
receiving an operation command from an end user to arrange or classify the desktop icons of the mirror desktop;
executing the operation command to arrange or classify the mirror desktop; and
saving the arranged mirror desktop after an arranging or classifying operation.

5. The method according to claim 1, wherein monitoring the operation object desktop is achieved by a registry information in a system, and the registry information monitors the change of the desktop icons of the operation object desktop to recognize the adding, deleting or modifying operation when the adding, deleting or modifying operation has occurred on the operation object desktop, and the adding, deleting or modifying operation is synchronized on the mirror desktop.

6. The method according to claim 1, wherein the step of monitoring the mirror desktop to monitoring the mirror desktop to edit the operation object desktop according to an adding, deleting or modifying operation occurred on the mirror desktop comprises:
monitoring a failure of the adding, deleting or modifying operation on the mirror desktop; and
stopping editing the operation object desktop.

7. A desktop management method, comprising:
acquiring desktop icons of an operation object desktop;
duplicating the desktop icons on the operation object desktop to generate a page with the desktop icons;

arranging the desktop icons on the page according to a predetermined arranging manner to be a mirror desktop;

adjusting the desktop icons of the mirror desktop according to the desktop icons of the operation object desktop to make the desktop icons of the mirror desktop the same as the operation object desktop thereof;

displaying the desktop icons of the adjusted mirror desktop according to an arranging manner for a saved mirror desktop, the desktop icons of the adjusted mirror desktop being displayed in accordance with a saved arrangement manner of the mirror desktop without affecting an original arrangement mode of the operation object desktop;

monitoring the operation object desktop to add, delete or modify on the mirror desktop when an adding, deleting or modifying operation occurred on the operation object desktop; and monitoring the mirror desktop to add, delete or modify on the operation object desktop when the adding, deleting or modifying operation occurred on the mirror desktop;

wherein the step of monitoring the operation object desktop to add, delete or modify on the mirror desktop when the adding, deleting or modifying operation occurred on the operation object desktop comprises monitoring a failure of the adding, deleting or modifying operation on the operation object desktop; and stopping editing the mirror desktop in response to the failure.

8. The method according to claim 7, wherein before the step of adjusting the desktop icons of the mirror desktop according to the desktop icons of the operation object desktop to make the desktop icons of the mirror desktop the same as that of the operation object desktop, the method further comprises:

adding, deleting or modifying the desktop icons of the mirror desktop according to the desktop icons of the operation object desktop to make the desktop icons of the mirror desktop the same as the operation object desktop thereof when the desktop icons of the operation object desktop are different from the desktop icons of the mirror desktop.

9. The method according to claim 7, wherein after the step of displaying the desktop icons of the adjusted mirror desktop according to the arranging manner for the saved mirror desktop, the method comprises:

receiving an operation command from an end user to arrange or classify the desktop icons of the mirror desktop;

executing the operation command to arrange or classify the mirror desktop; and saving the arranged mirror desktop after an arranging or classifying operation.

10. The method according to claim 7, wherein the step of monitoring the operation object desktop to add, delete or modify on the mirror desktop when the adding, deleting or modifying operation occurred on the operation object desktop comprises:

monitoring a failure of the adding, deleting or modifying operation on the operation object desktop; and stopping performing the adding, deleting or modifying operation on the mirror desktop.

11. The method according to claim 7, wherein the step of monitoring the mirror desktop to add, delete or modify on the operation object desktop when the adding, deleting or modifying operation occurred on the operation object desktop comprises:

monitoring a failure of the adding, deleting or modifying operation on the mirror desktop; and stopping performing the adding, deleting or modifying operation on the operation object desktop.

12. The method according to claim 11, wherein monitoring the operation object desktop is achieved by a registry information in a system, and the system information monitors the change of the desktop icons of the operation object desktop to recognize the adding, deleting or modifying operation when the adding, deleting or modifying operation has occurred on the operation object desktop, and the adding, deleting or modifying operation is synchronized on the mirror desktop.

13. A desktop management device, comprising:

an acquiring module configured for acquiring desktop icons of an operation object desktop to generate and start a mirror desktop;

an adjusting module configured for adjusting the desktop icons of the mirror desktop according to the desktop icons of the operation object desktop to make the desktop icons of the mirror desktop the same as that of the operation object desktop;

a display module configured for displaying the desktop icons of the adjusted mirror desktop according to the arranging manner for a saved mirror desktop, the desktop icons of the adjusted mirror desktop being displayed in accordance with a saved arrangement manner of the mirror desktop without affecting an original arrangement mode of the operation object desktop;

a first monitoring module configured for monitoring the operation object desktop;

a second monitoring module configured for monitoring the mirror desktop; and a synchronizing module is configured for adding, deleting or modifying on the mirror desktop when an adding, deleting or modifying operation occurred on the operation object desktop and adding, deleting or modifying on the operation object desktop when the adding, deleting or modifying operation occurred on the operation object desktop, wherein the first monitoring module is further configured for monitoring a failure of the adding, deleting or modifying operation on the operation object desktop and the synchronizing module won't perform the adding, deleting or modifying operation on the mirror desktop upon detection of the failure.

14. The device according to claim 13, wherein the device further comprises:

a mirror module configured for duplicating the desktop icons on the operation object desktop to generate a page with the desktop icons and arranging the desktop icons on the page according to a predetermined arranging manner of the mirror desktop.

15. The device according to claim 13, wherein the adjusting module is to add, delete or modify the desktop icons of the mirror desktop according to the desktop icons of the operation object desktop to make the desktop icon of the mirror desktop the same as the operation object desktop thereof when the desktop icons of the operation object desktop are different from the desktop icons of the mirror desktop.

16. The device according to claim 13, wherein the device further comprises:

a processing module configured for receiving an operation command from an end user to arrange or classify the desktop icons of the mirror desktop; and a saving module configured for saving the arranged mirror desktop after an arranging or classifying operation.

17. The device according to claim 13, wherein the second monitoring module is further configured for monitoring a failure of the adding, deleting or modifying operation on the mirror desktop and the synchronizing module won't perform the adding, deleting or modifying operation on the operation object desktop.

18. The device according to claim 17, wherein the first monitoring module is to monitor the operation object desktop by a registry information in a system, the system information monitors the change of the desktop icons of the operation object desktop to recognize the adding, deleting or modifying operation when the adding, deleting or modifying operation has occurred on the operation object desktop, and the adding, deleting or modifying operation is synchronized on the mirror desktop.

\* \* \* \* \*